United States Patent
Sharma et al.

(10) Patent No.: US 12,532,181 B2
(45) Date of Patent: Jan. 20, 2026

(54) METHODS, SYSTEMS, AND COMPUTER READABLE MEDIA FOR PERFORMING LOCATION AND VELOCITY CHECK AT SECURITY EDGE PROTECTION PROXY (SEPP) USING SERVICE COMMUNICATION PROXY (SCP)

(71) Applicant: Oracle International Corporation, Redwood Shores, CA (US)

(72) Inventors: Ashish Jyoti Sharma, New Delhi (IN); Jay Rajput, Bangalore (IN); John Nirmal Mohan Raj, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 357 days.

(21) Appl. No.: 18/135,108

(22) Filed: Apr. 14, 2023

(65) Prior Publication Data
US 2024/0349059 A1 Oct. 17, 2024

(51) Int. Cl.
*H04W 12/63* (2021.01)
*H04W 12/06* (2021.01)
*H04W 60/00* (2009.01)

(52) U.S. Cl.
CPC .......... *H04W 12/63* (2021.01); *H04W 12/06* (2013.01); *H04W 60/00* (2013.01)

(58) Field of Classification Search
CPC .............................. H04W 12/122; Y02D 30/70
See application file for complete search history.

(56) References Cited

U.S. PATENT DOCUMENTS

| 10,470,154 B2 | 11/2019 | Chellamani et al. |
| 10,834,045 B2 | 11/2020 | Mahalank et al. |

(Continued)

OTHER PUBLICATIONS

Commonly-Assigned, co-pending U.S. Appl. No. 18/135,105 for "Methods, Systems, and Computer Readable Media for Performing Location and Velocity Check at Security Edge Protection Proxy (SEPP) to Avoid Spoofing" (Unpublished, filed Apr. 14, 2023).

(Continued)

*Primary Examiner* — Fabricio R Murillo Garcia
(74) *Attorney, Agent, or Firm* — Jenkins, Taylor & Hunt, P.A.

(57) ABSTRACT

A method for performing a location and velocity check at a security edge protection proxy (SEPP) using a service communication proxy (SCP) includes receiving, at an SEPP, an SBI request message relating to a user equipment (UE). The method further includes querying, by the SEPP, a service communication proxy (SCP) to obtain information indicative of a last known update of the UE with the home network of the UE. The method further includes receiving, at the SEPP, a response from the SCP, the response including the information indicative of the last known update of the UE. The method further includes reading, by the SEPP and from the response, the information indicative of the last known update of the UE. The method further includes performing, by the SEPP and using the information indicative of the last known update of the UE, a location and velocity check for the UE. The method further includes performing a network security action based on results of the location and velocity check.

18 Claims, 7 Drawing Sheets

(56) References Cited

U.S. PATENT DOCUMENTS

| | | | |
|---|---|---|---|
| 12,262,208 | B2 | 3/2025 | Sharma et al. |
| 2006/0276226 | A1 | 12/2006 | Jiang |
| 2010/0313024 | A1 | 12/2010 | Weniger et al. |
| 2011/0014939 | A1 | 1/2011 | Ravishankar et al. |
| 2011/0170532 | A1 | 7/2011 | Tchepnda et al. |
| 2021/0297935 | A1* | 9/2021 | Belling ............... H04W 40/00 |
| 2022/0070674 | A1 | 3/2022 | Russell |
| 2022/0159445 | A1 | 5/2022 | Rajavelu |
| 2022/0167157 | A1* | 5/2022 | Tiwari ................ H04L 9/3242 |
| 2022/0201489 | A1 | 6/2022 | Mahalank et al. |
| 2022/0272541 | A1 | 8/2022 | Rajput et al. |
| 2022/0369091 | A1 | 11/2022 | Nair et al. |
| 2023/0262456 | A1* | 8/2023 | Tiwari ................ H04W 12/06 726/6 |
| 2024/0334382 | A1* | 10/2024 | Yao ...................... H04L 43/067 |
| 2024/0349057 | A1* | 10/2024 | Sharma ............... H04W 12/61 |

OTHER PUBLICATIONS

5G Interconnect Security, GSMA FS-36, Version 2.0, Jun. 3, 2021.
3rd Generation Partnership Project; Technical Specification Group Services and System Aspects; Security architecture and procedures for 5G system (Release 18) 3GPP TS 33.501 V18.0.0 (Dec. 2022).
3rd Generation Partnership Project; Technical Specification Group Core Network and Terminals; 5G System; Principles and Guidelines for Services Definition; Stage 3 (Release 18) 3GPP TS 29.501 V18.0.0 (Dec. 2022).
3rd Generation Partnership Project; Technical Specification Group Core Network and Terminals; 5G System; Technical Realization of Service Based Architecture; Stage 3 (Release 18) 3GPP TS 29.500 V18.0.0 (Dec. 2022).
3rd Generation Partnership Project; Technical Specification Group Core Network and Terminals; 5G System; Network Function Repository Services; Stage 3 (Release 18) 3GPP TS 29.510 V18.1.0 (Dec. 2022).
3rd Generation Partnership Project; Technical Specification Group Services and System Aspects; Procedures for the 5G System (5GS); Stage 2 (Release 17) 3GPP TS 23.502 V17.7.0 (Dec. 2022).
3rd Generation Partnership Project; Technical Specification Group Services and System Aspects for the 5G System (5GS); Stage 2; (Release 17) 3GPP TS 23.501 V17.7.0 (Dec. 2022).
"3rd Generation Partnership Project; Technical Specification Group Services and System Aspects; Security architecture and procedures for 5G system (Release 18)" 3GPP TS 33.501 V18.1.0, pp. 1-293 (Mar. 2023).
Yakhlef et al., "Simulation of Location Management Strategies of Timer, Location Area, and Movement Based Update/Paging for Wireless Networks", May 2013, the International Conference on Technological Advances in Electrical Electronics and Computer Engineering. pp. 595-599 (Year: 2013).
Hailu et al., "Hybrid paging and Location Tracking Scheme for Inactive 5G UEs", Jun. 2017, European Conference on Networks and Communications, pp. 1-6 (Year: 2017).
Notice of Allowance for U.S. Appl. No. 18/135,105 (Dec. 10, 2024).

\* cited by examiner

METHODS, SYSTEMS, AND COMPUTER READABLE MEDIA FOR PERFORMING LOCATION AND VELOCITY CHECK AT SECURITY EDGE PROTECTION PROXY (SEPP) USING SERVICE COMMUNICATION PROXY (SCP)

TECHNICAL FIELD

The subject matter described herein relates to protecting against spoofing attacks in an operator's network. More particularly, the subject matter described herein relates to performing a location and velocity check at the SEPP using an SCP.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G and other types of networks is that network operators do not have an effective mechanism for validating incoming service-based interface (SBI) request messages relating to user equipment (UEs) at the SEPP. For example, a subscriber's last authenticated state may be present in a home network authentication database (e.g., an authentication server function (AUSF). However, the subscriber might still be active in the home network without any reauthentication. In one scenario, a UE is active in the home network until 10:00 AM, authentication was last performed at 6:00 AM, and a new authentication request for the UE arrives from a foreign network at 10:05 AM. If a time and velocity check is implemented at the SEPP, the check will pass given that authentication was performed at 6:00 AM and within allowed timelines (assuming >4 hours to move to the foreign network would be allowed). However, allowing the check to pass may lead to incorrect handling within the network since the subscriber is still active in the home network, and the authentication server function (AUSF) in the home network now has the additional burden to check the new authentication request and make the necessary corrections. This is a security issue.

The fact that the location and velocity check passes may allow an attacker to successfully implement a spoofing attack. For example, if the real UE is active in the network, an attacker should not be able to spoof the UE's identity and send authentication or other messaging into the network from outside of the network.

Accordingly, there exists a need for improved methods, systems, and computer readable media for performing a location and velocity check for messaging relating to UEs.

SUMMARY

A method for performing a location and velocity check at a security edge protection proxy (SEPP) using a service communication proxy (SCP) includes receiving, at an SEPP, an SBI request message relating to a user equipment (UE). The method further includes querying, by the SEPP, a service communication proxy (SCP) to obtain information indicative of a last known update of the UE with the home network of the UE. The method further includes receiving, at the SEPP, a response from the SCP, the response including the information indicative of the last known update of the UE. The method further includes reading, by the SEPP and from the response, the information indicative of the last known update of the UE. The method further includes performing, by the SEPP and using the information indicative of the last known update of the UE, a location and velocity check for the UE. The method further includes performing a network security action based on results of the location and velocity check.

According to another aspect of the subject matter described herein, receiving the SBI request message includes receiving an Nausf_UE_Authentication_Authenticate request message.

According to another aspect of the subject matter described herein, receiving an SBI request message includes receiving an Nudm_UECM_Registration_Request message.

According to another aspect of the subject matter described herein, querying the SCP includes querying the SCP using an application programming interface provided by the SCP for obtaining the information indicative of the last known update.

According to another aspect of the subject matter described herein, receiving the response including the information indicative of the last known update includes receiving the response including a serving network identifier and a time of the last known update.

According to another aspect of the subject matter described herein, performing the location and velocity check includes determining that the serving network identifier indicates a non-home network of the UE and that the UE is a stationary device.

According to another aspect of the subject matter described herein, performing the network security action includes blocking the SBI request message in response to determining that the serving network identifier indicates a non-home network of the UE and that the UE is a stationary device.

According to another aspect of the subject matter described herein, performing the location and velocity check includes determining whether a distance between a previous roaming network of the UE and a current roaming network of the UE is greater than a distance that could have been traveled by the UE in light of a time difference between a time associated with the last known update information of the UE and the time of receipt of the SBI request message.

According to another aspect of the subject matter described herein, performing the network security action includes blocking the SBI request message in response to determining that the previous network of the UE and a current network of the UE are separated by a distance could not have been traveled by the UE within the time difference.

According to another aspect of the subject matter described herein, the SEPP comprises a home network SEPP of the UE.

According to another aspect of the subject matter described herein, a system for performing a location and velocity check at a security edge protection proxy (SEPP) using a service communication proxy (SCP) includes an SCP including an application programming interface (API) for providing access to last known update information for user equipment (UEs). The system further includes an SEPP for receiving a service-based interface (SBI) request message relating to a UE, querying the SCP to obtain last known update information for the UE, receiving a response from the SCP, the response including the information indicative of the last known update of the UE, the SEPP for reading, from the response, the information indicative of the last known update of the UE, performing, using the information indicative of the last known update of the UE, a location and velocity check for the UE, and performing a network security action based on results of the location and velocity check.

According to another aspect of the subject matter described herein, the SBI request message comprises an Nausf_UE_Authentication_Authenticate request message.

According to another aspect of the subject matter described herein, the SBI request message comprises Nudm_UECM_Registration_Request message.

According to another aspect of the subject matter described herein, the SEPP is configured to query the SCP using the API provided by the SCP for obtaining the information indicative of the last known update.

According to another aspect of the subject matter described herein, the last known update information includes a serving network identifier and a time of a last known update of the UE.

According to another aspect of the subject matter described herein, the SEPP is configured to perform the location and velocity check by determining that the serving network identifier indicates a non-home network of the UE and that the UE is a stationary device.

According to another aspect of the subject matter described herein, the SEPP is configured to perform the network security action by blocking the SBI request message in response to determining that the serving network identifier indicates a non-home network of the UE and that the UE is a stationary device.

According to another aspect of the subject matter described herein, the SEPP is configured to perform the location and velocity check by determining whether a distance between a previous roaming network of the UE and a current roaming network of the UE is greater than a distance that could have been traveled by the UE in light of a time difference between a time associated with the last known update information of the UE and the time of receipt of the SBI request message.

According to another aspect of the subject matter described herein, the SEPP is configured to perform the network security action by blocking the SBI request message in response to determining that the previous network of the UE and a current network of the UE are separated by a distance could not have been traveled by the UE within the time difference.

According to another aspect of the subject matter described herein, one or more non-transitory computer readable media having stored thereon executable instructions that when executed by a processor of a computer control the computer to perform steps are provided. The steps include receiving, at a security edge protection proxy (SEPP), an SBI request message relating to a user equipment (UE). The steps further include querying, by the SEPP, a service communication proxy (SCP) to obtain information indicative of a last known update of the UE with the home network of the UE. The steps further include receiving, at the SEPP, a response from the SCP, the response including the information indicative of the last known update of the UE. The steps further include reading, by the SEPP and from the response, the information indicative of the last known update of the UE. The steps further include performing, by the SEPP and using the information indicative of the last known update of the UE, a location and velocity check for the UE. The steps further include performing a network security action based on results of the location and velocity check.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
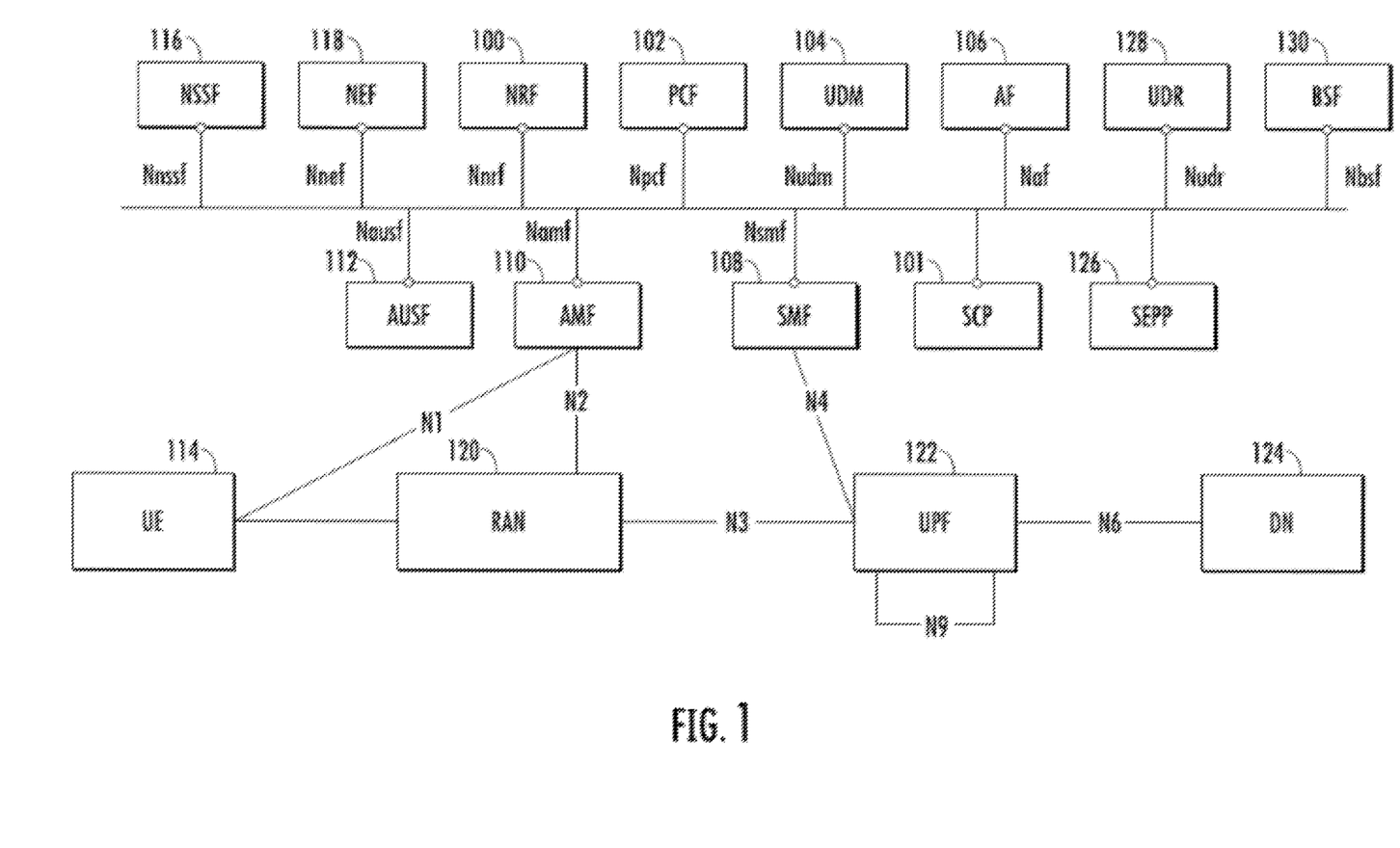
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user UE 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. RAN 120 may be accessed using a gNB (not shown in FIG. 1) or other wireless access point. A user plane function (UPF) 122 can support various proxy functionalities for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription and authentication data for UEs. A binding support function (BSF) 130 manages bindings between PDU sessions and PCFs.

Figure 2:
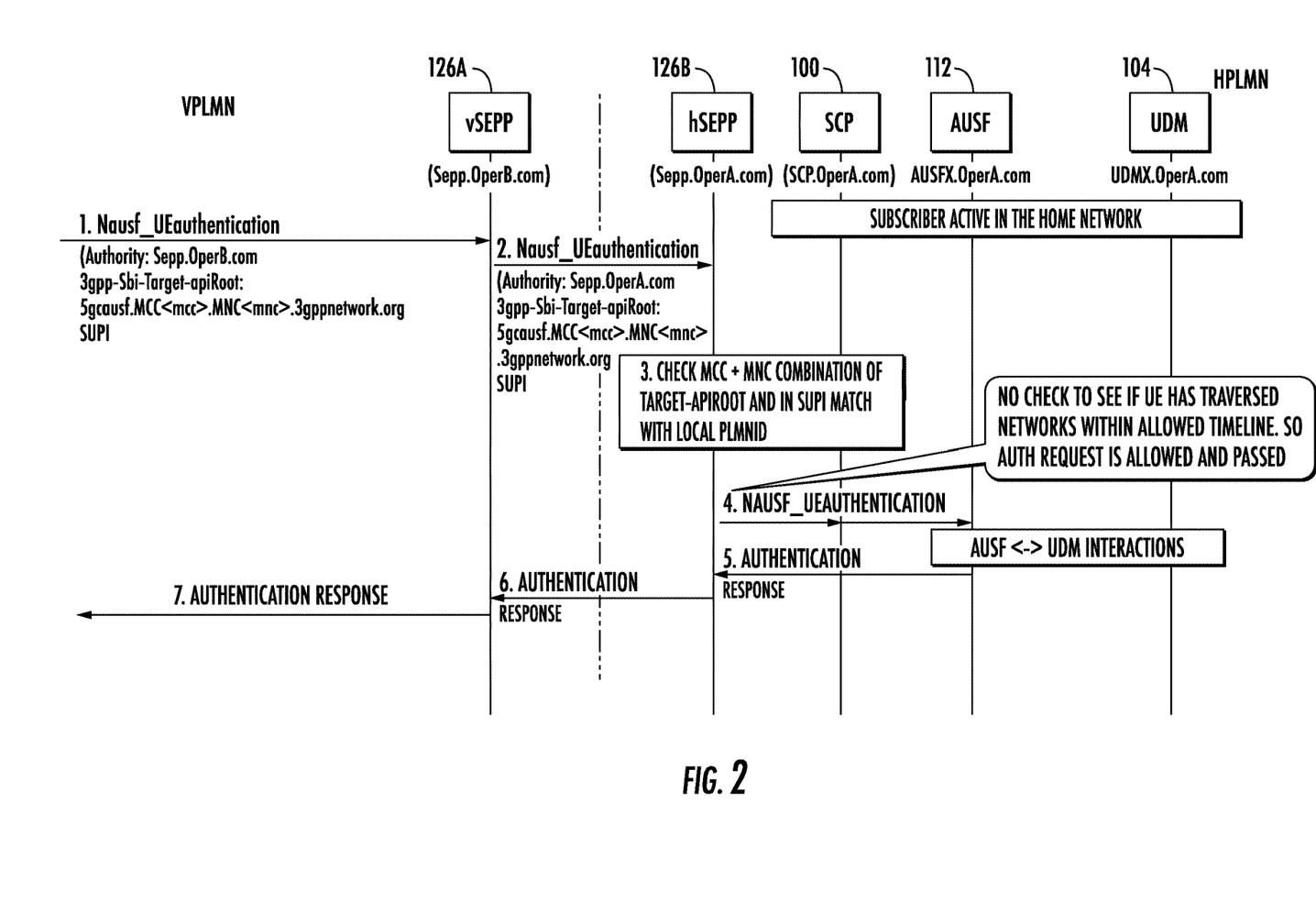
FIG. 2 is a message flow diagram illustrating authentication messaging without a location and velocity check at the SEPP.

As stated above, one problem that can occur in 5G and other types of networks is that existing location and velocity and/or security checks at an SEPP are inadequate to protect against security attacks, such as spoofing attacks. FIG. 2 is a message flow diagram illustrating authentication messaging without a location and velocity check at the SEPP. Referring to FIG. 2, in step 1, vSEPP 126A receives an Nausf_UEAuthentication_Authenticate request message originating from either a legitimate AMF serving the UE or from a hacker seeking to spoof the identity of the UE. In step 2, vSEPP 126A forwards the Nausf_UEAuthentication_Authenticate request message to hSEPP 126B. In step 3, hSEPP 126B checks the mobile country code (MCC) and mobile network code (MNC) from the targetApiroot header and the subscription permanent identifier (SUPI) of the Nausf_UEAuthentication_Authenticate request message to determine whether these terms match with the local PLMN ID. In this example, it is determined that the identifiers match the local PLMN ID. It should be noted that the verification in step 3 is optional and may be omitted without departing from the scope of the subject matter described herein. If the parameters being verified in step 3 match the local PLMN ID or if step 3 is omitted, control proceeds to step 4 where SEPP 126B forwards the Nausf_UEAuthentication_Authenticate request message to AUSF 112. There is no check to see if the UE has traversed networks within an allowed timeline. The Nausf_UEAuthentication_Authenticate request message passes through SCP 100, which forwards the message to AUSF 112. AUSF 112 signals with UDM 104 to obtain authentication information for the UE. In step 5, AUSF 112 generates and sends an Nausf_UEAuthentication_Authenticate response to hSEPP 126B. In step 6, hSEPP 126B forwards the authentication response to vSEPP 126A. In step 7, vSEPP 126A forwards the authentication response to the sender.

Because there is no security check for the Nausf_UEAuthentication_Authenticate request message, a hacker can make such a request and gain access to subscriber data in the HPLMN. To reduce the likelihood of successful spoofing attacks based on messaging concerning UE authentication or registration, hSEPP 126B may perform a location and velocity check for authentication and other messaging concerning a UE using information obtained from an SCP. Using information from an SCP to perform location and velocity checks is advantageous because the SCP is a central point for routing messages and is therefore likely to have updated information regarding the UE. The subject matter described herein includes an API provided by the SCP to allow the SEPP to retrieve timing and location information that can be used for a location and velocity check for a UE.

When registration or authentication of a UE triggers a request to be sent to the home network, the home SEPP queries the SCP to retrieve a last known update time and location for the UE. In one example, the last known update time may be a last known authentication time. In another example, the last known update time may be a last known registration time. The last known location may be determined from the PLMN ID, transfer area (TA) or other parameter associated with the last known update of the UE. The SEPP then checks the received ingress request message to determine whether the UE activity (e.g., authentication or registration activity) is within allowed timelines based on the last known update time and location. If the activity is within allowed timelines, the SEPP may allow the message to pass. If the activity is not within allowed timelines, the SEPP may perform a network security action, such as blocking the message, blocking all messages from the sender, and/or alerting the network operator. For example, if the SEPP determines that the distance traveled by the UE indicated by a current message and a last known update exceeds an operator-defined threshold given the time between the current message and the last known update and the distance between the current UE location and the location associated with the last known update, the SEPP may discard the message.

Figure 3:
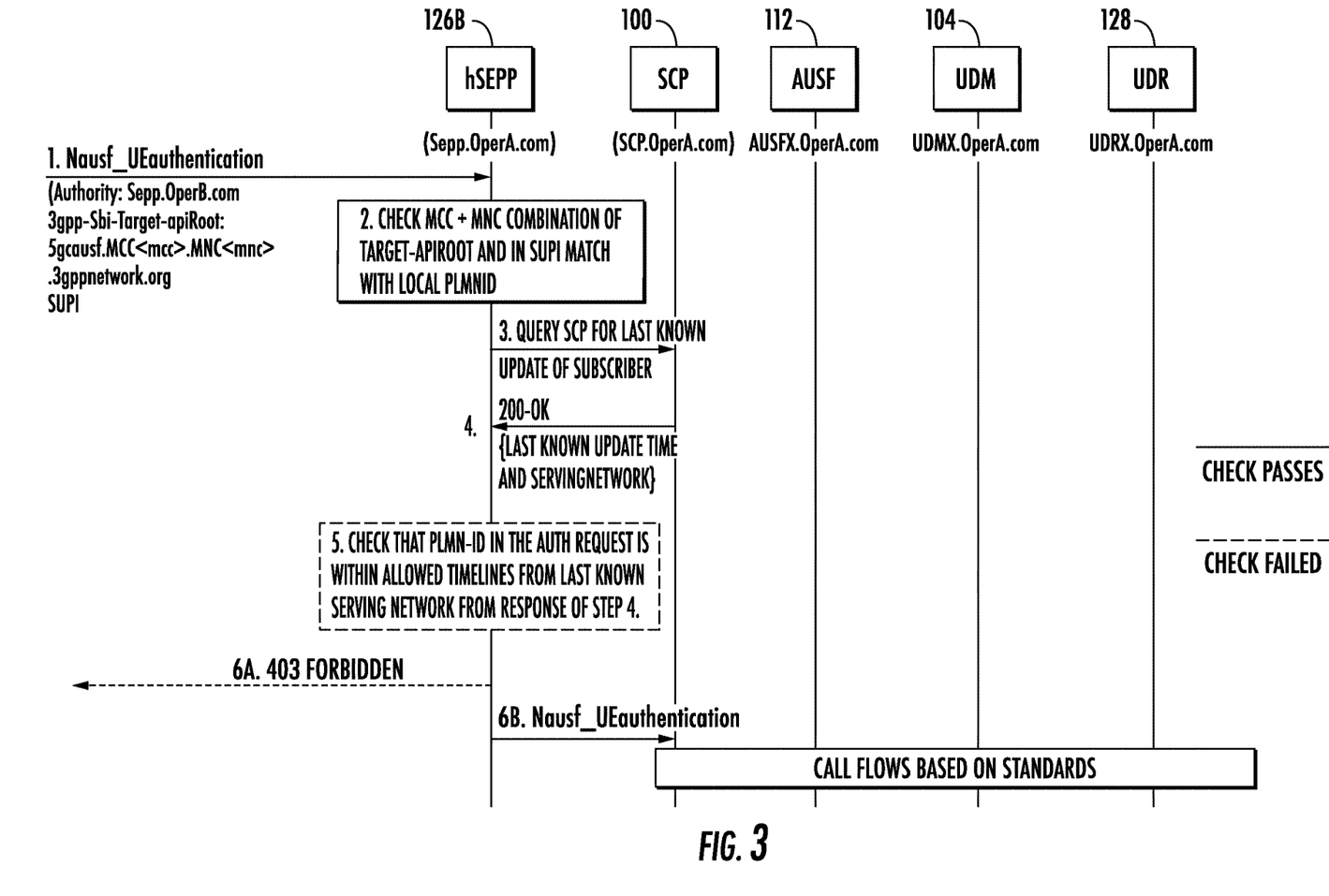
FIG. 3 is a message flow diagram illustrating authentication messaging with a location and velocity check at the SEPP using information obtained from an SCP.

FIG. 3 is a message flow diagram illustrating authentication messaging with a location and velocity check at the SEPP using information obtained from an SCP. Referring to FIG. 3 in step 1, hSEPP 126B receives an Nausf_UEAuthentication_Authenticate request message. In step 2, hSEPP 126B checks the MNC and MCC combination of the targetApiroot header and in the SUPI to determine whether they match with the local PLMN ID. It should be noted that the verification in step 2 is optional and can be omitted without departing from the scope of the subject matter described herein. If step 2 is omitted or if the parameters being verified in step 2 match the local PLMN ID, in step 3, hSEPP 126B queries SCP 100 for the last known update of the UE. In step 4, SCP 100 responds with the last known update information for the UE. The last known update information includes the time associated with the last known update (where the update can be any type of signaling triggered by the UE in the home network) and a location of the last known update. In one example, the location may be the identity of the network serving the UE at the time of the last known update.

In step 5, hSEPP 126B determines whether the authentication message received in step 1 is within an allowed timeline given the last known update information obtained from SCP 100 in step 4. Step 5 may be achieved by computing a distance between the current location of the UE and the location of the last known update, computing a time difference between the current time and the time of the last known update, and determining whether the distance is above an operator-defined threshold for the time difference. If the distance is greater than the operator-defined threshold, SEPP 126B may determine that the message fails the location and velocity check. If the distance is less than the operator-defined threshold, SEPP 126B may determine that the message passes the location and velocity check.

In step 6A, if hSEPP 126B determines that the authentication message is not within the allowed timeline, hSEPP 126B blocks the message and sends a response message, such as a 403 Forbidden response, to the originator of the authentication request message. If hSEPP 126B determines that the authentication message is within the allowed timeline, in step 6B, hSEPP 126B sends the message to SCP 100, which routes the message to AUSF 112. AUSF 112 then signals with UDM 104 to obtain authentication information for the UE.

Figure 4:
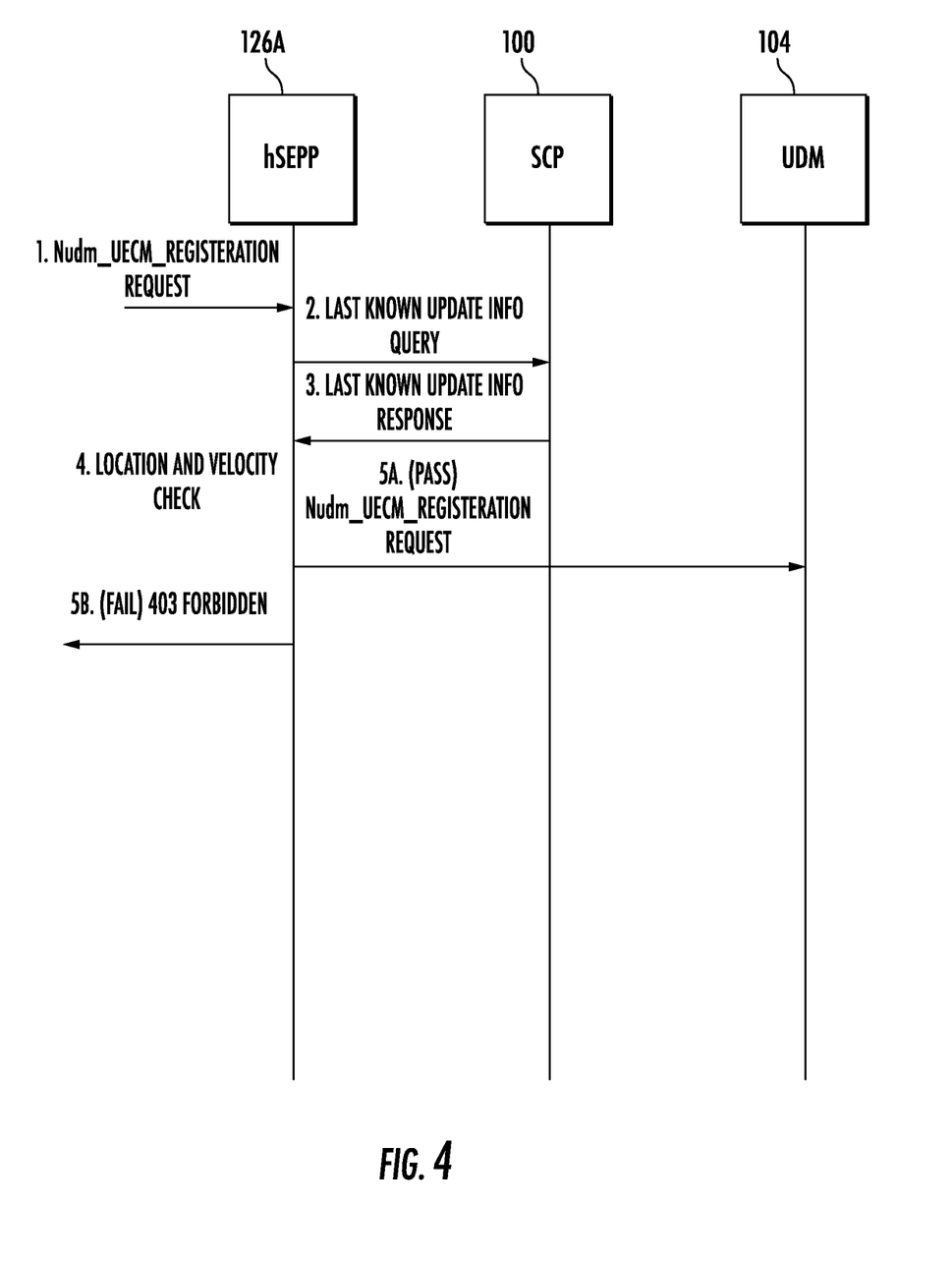
FIG. 4 is an exemplary message flow diagram illustrating UE registration messaging with a location and velocity check at the SEPP.

Another type of messaging that may be used to attack a network is UE registration messaging. FIG. 4 is an exemplary message flow diagram illustrating UE registration messaging with a location and velocity check at the SEPP. Referring to FIG. 4, in step 1, SEPP 126B receives an Nudm_UECM_Registration request message. In step 2, SEPP 126B queries SCP 100 for last update information regarding the UE. In step 3, SCP 100 sends the last known update information to SEPP 126B. In step 4, SEPP 126B uses the last known update information along with information in the UE registration request to perform a location and velocity check. Performing the location and velocity check may include determining whether the Nudm_UECM_Registration request is within allowed timelines, given the location information associated with the registration request, the time of receipt of the registration request, the location associated with the last known update, and the time of the last known update. In step 5A, if the request is within allowed timelines, hSEPP 126B forwards the Nudm_UECM_Registration request to UDM 104. In step 5B, if hSEPP 126B determines that the request is not within allowed timelines, hSEPP 126B may perform a network security action, such as discarding the message and/or sending an error response, as indicated in step 5B.

Figure 5:
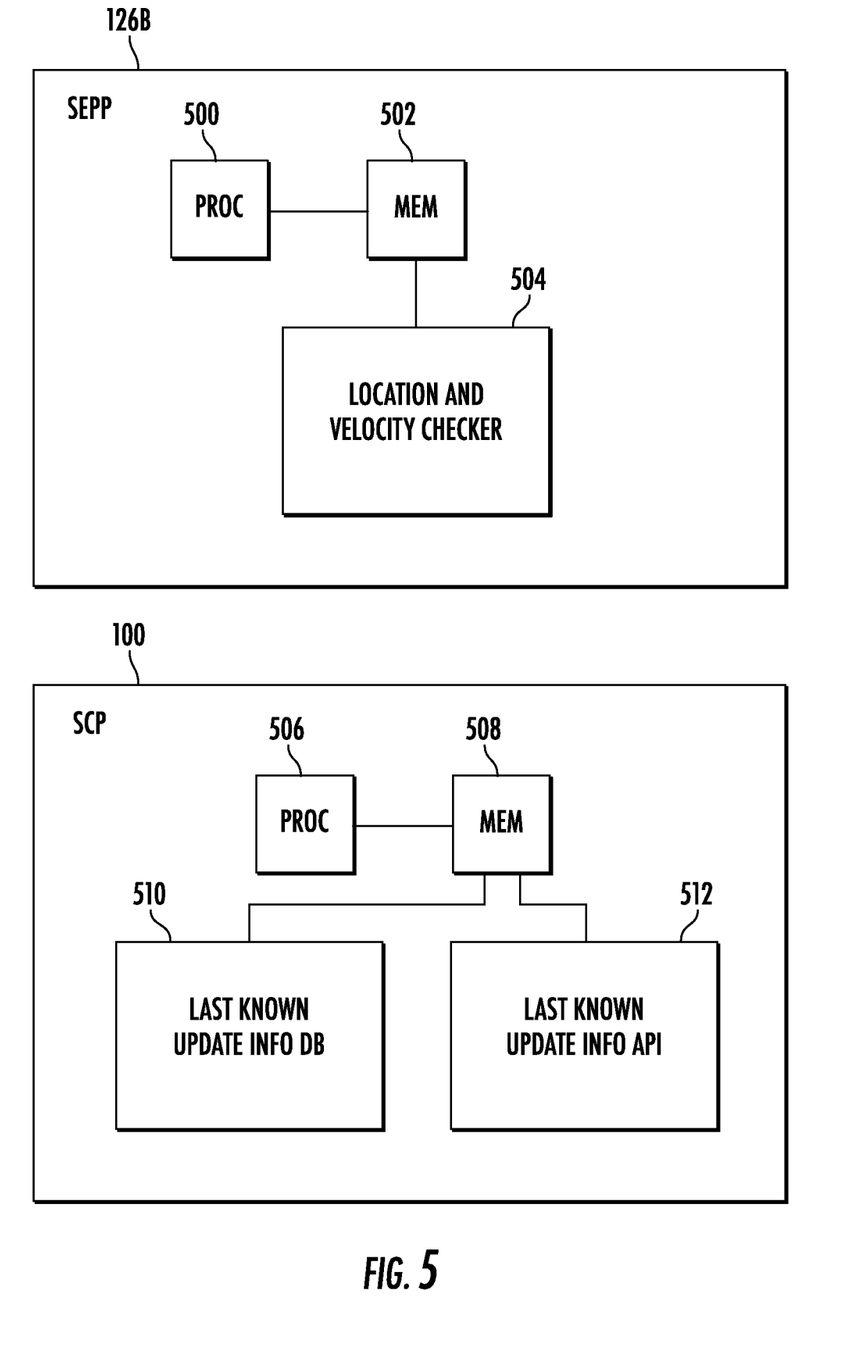
FIG. 5 is a block diagram illustrating an exemplary architecture for an SEPP and an SCP for performing a location and velocity check.

FIG. 5 is a block diagram illustrating an exemplary architecture for an SEPP and an SCP for performing a location and velocity check. Referring to FIG. 5, SEPP 126B includes at least one processor 500 and memory 502. SEPP 126B also includes a location and velocity checker 504 that may be implemented using computer executable instructions stored in memory 502 and executed by processor 500. Location and velocity checker 504 may perform the steps described herein for conducting location and velocity checks at the SEPP using information obtained from an SCP.

SCP 100 includes at least one processor 506 and memory 508. SCP 100. SCP also includes a last known update information database 510 stored in memory 508 and a location and velocity check information application programming interface (API) 512 that allows other nodes to obtain last known update information stored in database 510. SCP 100 stores last known information for messages relating to UEs that are routed by SCP 100 in database 510. For example, if SCP 100 receives an Nausf_UE_Authentication_Authenticate request message, SCP 100 may store in a record in database 510 the time of receipt of the message as the last known update time of the UE. SCP 100 may also store in the record in database 510 the serving network name from the Nausf_UE_Authentication_Authenticate request message as the last network with which the UE was known to have contact. If the message is an Nudm_UECM_Registration_Request message, SCP 100 may store in a record in database 510 the time of receipt of the message by SCP 100 as the time of the last known update of the UE. SCP 100 may also store in the record in database 510 the transfer area identifier (TAI) or PLMN identifier from the Nudm_UECM_Registration_Request message. Table 1 shown below illustrates an example of last known update information that may be stored in database 510 for two UEs, UE1 and UE2.

| UE Identifier | Last Known Update Time | Network of Last Known Update |
| --- | --- | --- |
| GUTI or SUCI for UE1 | 2300.01 | PLMNID1 or TAI1 |
| GUTI or SUCI for UE2 | 2300.50 | PLMNID2 or TAI2 |

Table 1: Last Known Update Information stored for UE1 and UE2 From Table 1, last known update information is stored for UE1 and UE2. Each row in Table 1 corresponds to a database record in database 510. The database records are each indexed by a subscriber identifier, such as a globally unique temporary identifier (GUTI) or a subscription concealed identifier (SUCI). This database record also includes the time and place of the last known update, which can be queried and used by hSEPP 126B for location and velocity checks. For example, when hSEPP 126B receives a new authentication or registration request message, hSEPP 126B may determine the time of receipt of the authentication or registration request message. hSEPP 126B may also read the PLMN ID and/or TAI and the GUTI or SUCI from the authentication or registration request message. hSEPP 126B may then determine the distance between the current network of the UE and the last known network of the UE recorded by the SCP. hSEPP 126B then subtracts the time of the last known update from the current time. hSEPP 126B may then compute UE velocity as follows:

$$UE\ velocity = \frac{\text{Distance between current location and location of last known update}}{\text{Difference between current time and time of last known update}}$$

Once hSEPP 126B determines the UE velocity, SEPP 126B may compare the velocity to an operator-defined velocity threshold. For example, the network operator may set a velocity threshold to 500 mph to account for air travel between UE locations. If the calculated UE velocity is less than the operator-defined threshold, hSEPP 126B may allow the message into the network. If the calculated velocity is greater than the operator-defined velocity threshold, SEPP 126B may perform a network security action, including blocking the message from entering the network, blocking a sender of the message, and/or notifying the network operator.

In another example, hSEPP 126B may perform the location and velocity check for a received SBI request by determining whether network identification information a received SBI request message is appropriate for the device type. For example, if the device type is a stationary sensor, and the last known update of the sensor is a registration of the sensor in the home network of the UE, hSEPP 126B may block a registration or authentication request message for the sensor that originates from outside of the home network.

Figure 6:
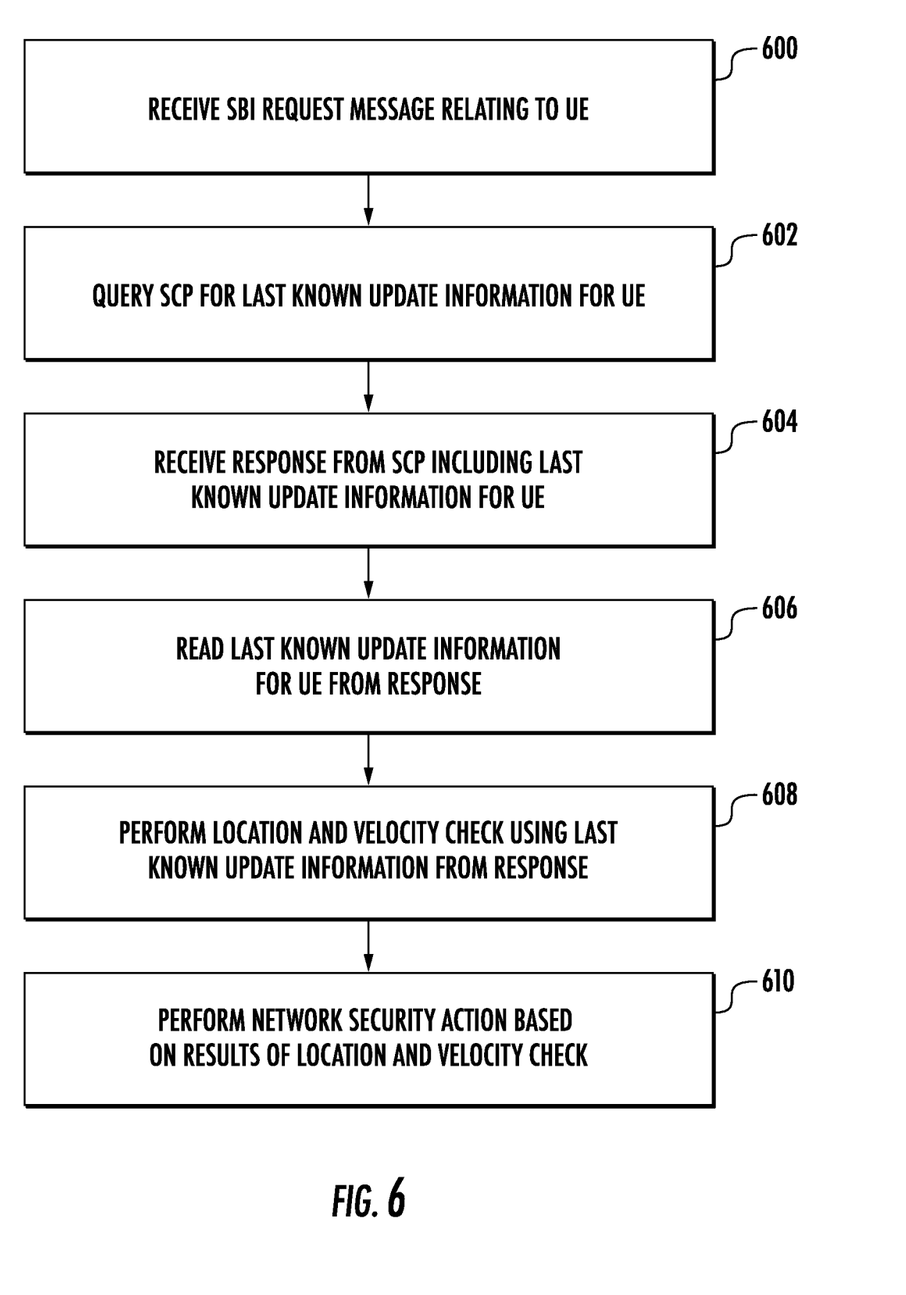
FIG. 6 is a flow chart illustrating an exemplary process for performing a location and velocity check at an SEPP using data obtained from the SCP.

FIG. 6 is a flow chart illustrating an exemplary process for performing a location and velocity check at an SCP using data obtained from the SCP. Referring to FIG. 6, in step 600, the process includes receiving, at an SEPP, an SBI request message relating to a user equipment (UE). Example, the SBI request message may be an Nausf_UE_Authentication_Authenticate request message. In another example, the message may be an Nudm_UECM_Registration_Request message. Other types of messages from which the current location of the UE can be determined are intended to be within the scope of the subject matter described herein.

In step 602, the process includes querying, by the SEPP, an SCP to obtain information indicative of a last known update of the UE. For example, SEPP 126B may query SCP 100 for the last known update information using the API provided by SCP 100. The last known update information may include the last time the user was attached to the network and the identity of the network to which the UE was attached at the time of the last known update.

In step 604, the process includes receiving, at the SEPP, a response from the SCP, the response including the information indicative of the last known update of the UE. For example, hSEPP 126B may receive a response from SCP 100 including the last known update information described with respect to step 602.

In step 606, the process includes reading, by the SEPP and from the response, the information indicative of the last known update of the UE. For example, SEPP 126B may read the previous serving network identifier and the time associated with the last known update of the UE from the response.

In step 608, the process includes performing, by the SEPP and using the information indicative of the last known update of the UE, a location and velocity check for the UE. In one example, performing the location and velocity check may include determining whether the action associated with the SBI request is within allowed timelines, as described above.

In step 610, the process includes performing a network security action based on results of the location and velocity check. For example, if the received message fails the location and velocity check, the network security action may include blocking the message, blocking a sender of the message, and/or alerting the network operator. If the message passes the location and velocity check, the network security action may include forwarding the message to its intended destination.

Figure 7:
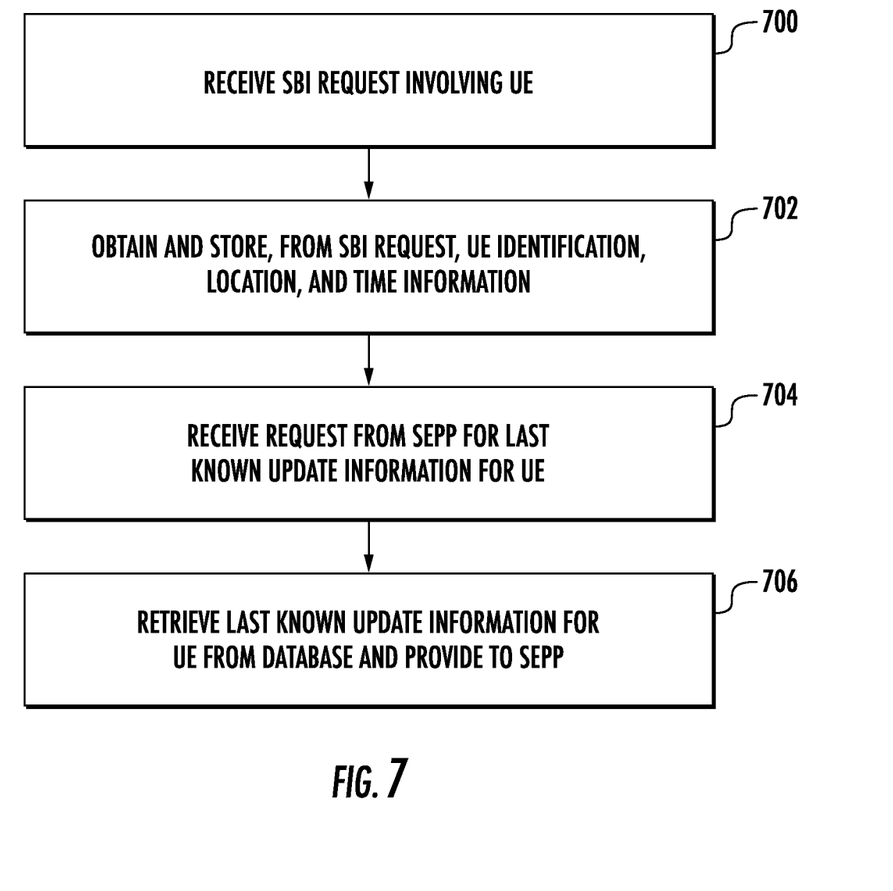
FIG. 7 is a flow chart illustrating an exemplary process performed by the SCP in storing location and time information for a UE and in providing the information to the SEPP.

FIG. 7 is a flow chart illustrating an exemplary process performed by the SCP in storing location and time information for a UE and in providing the information to the SEPP. Referring to FIG. 7, in step 700, the SCP receives an SBI request message regarding a UE. The message may be any message concerning a UE, including, but not limited to, an Nausf_UE_Authentication_Authenticate request message or an Nudm_UECM_Registration request message.

In step 702, the SCP obtains and stores UE identification, location, and time information from the received SBI request message. For example, if the message is an Nudm_UECM_Registration request, the SCP may read the SUPI as the identifier of the UE. The SCP may also read the PLMN ID of the serving PLMN from the Nudm_UECM_Registration request. The SCP may also read the time of receipt of the Nudm_UECM_Registration request. The SCP may store the time of receipt, the UE identifier, and the location indicator in a record in the last known update information database.

If the message is an Nausf_UE_Authentication_Authenticate request message, the SCP may read the SUPI or the SUCI as the identifier for the UE, the serving network name as the location indicator and the time of receipt of the message as the time associated with the last known update information database record.

In step 704, the SCP receives a request for accessing information in the last known update information database. For example, the SEPP may query the SCP via the API published by the SCP for access to the last known update information database. The query may include a UE identifier, such as a SUPI or SUCI.

In step 706, the SCP retrieves the last known update information from the last known update information database and provides the information to the SEPP. For example, the SCP may perform a lookup in the last known update information database using the UE identifier from the query message, locate a record corresponding to the UE identifier in the last known update information database, read the location and time information from the corresponding record in the database, and provide the location and time information to the SEPP in a response to the query message.

Advantages of the subject matter described herein include enhanced security at the edge of the network. Using the subject matter described herein, the UE can reduce the likelihood of successful spoofing attacks by performing the location and velocity check at the beginning of a UE's association with a network, rather than after a subscriber has authenticated with the network, as described in GSMA FS-36. Performing the location and velocity check using information from the SCP is also believed to be advantageous because the SCP receives or routes all messages in the home network and therefore is an advantageous point to collect last known update information.

The disclosure of each of the following references is hereby incorporated herein by reference in its entirety.

REFERENCES 1. 3$^{rd}$ Generation Partnership Project; Technical Specification Group Services and System Aspects for the 5G System (5GS); Stage 2; (Release 17) 3GPP TS 23.501 V17.7.0 (2022-12)
2. 3$^{rd}$ Generation Partnership Project; Technical Specification Group Services and System Aspects; Procedures for the 5G System (5GS); Stage 2 (Release 17) 3GPP TS 23.502 V17.7.0 (2022-12)
3. 3$^{rd}$ Generation Partnership Project; Technical Specification Group Core Network and Terminals; 5G System; Network Function Repository Services; Stage 3 (Release 18) 3GPP TS 29.510 V18.1.0 (2022-12)
4. 3$^{rd}$ Generation Partnership Project; Technical Specification Group Core Network and Terminals; 5G System; Technical Realization of Service Based Architecture; Stage 3 (Release 18) 3GPP TS 29.500 V18.0.0 (2022-12)
5. 3$^{rd}$ Generation Partnership Project; Technical Specification Group Core Network and Terminals; 5G System; Principles and Guidelines for Services Definition; Stage 3 (Release 18) 3GPP TS 29.501 V18.0.0 (2022-12)
6. 3$^{rd}$ Generation Partnership Project; Technical Specification Group Services and System Aspects; Security architecture and procedures for 5G system (Release 18) 3GPP TS 33.501 V18.0.0 (2022-12)
7. 5G Interconnect Security, GSMA FS-36, Version 2.0, 3 Jun. 2021.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for performing a location and velocity check at a security edge protection proxy (SEPP) using a service communication proxy (SCP), the method comprising:
   receiving, at the SEPP, a service-based interface (SBI) request message relating to a user equipment (UE);
   querying, by the SEPP, the service communication proxy (SCP) to obtain information indicative of a last known update of the UE with a home network of the UE;
   receiving, at the SEPP, a response from the SCP, the response including the obtained information indicative of the last known update of the UE;
   reading, by the SEPP and from the response, the obtained information indicative of the last known update of the UE;
   performing, by the SEPP and using the obtained information indicative of the last known update of the UE, the location and velocity check for the UE, wherein performing the location and velocity check includes determining whether a distance between a previous network of the UE indicated by the information obtained from the SCP and a current network of the UE indicated by the SBI request message is greater than a distance that could have been traveled by the UE in light of a time difference between a time associated with the last known update information of the UE and the time of receipt of the SBI request message; and
   performing a network security action based on results of the location and velocity check.

2. The method of claim 1, wherein receiving the SBI request message includes receiving an NausfUE_Authentication_Authenticate request message.

3. The method of claim 1, wherein receiving an SBI request message includes receiving an Nudm_UECMRegistration_Request message.

4. The method of claim 1, wherein querying the SCP includes querying the SCP using an application programming interface provided by the SCP for obtaining the information indicative of the last known update.

5. The method of claim 1, wherein receiving the response including the information indicative of the last known update includes receiving the response including a serving network identifier and a time of the last known update.

6. The method of claim 5, wherein performing the location and velocity check includes determining that the serving network identifier indicates a non-home network of the UE and that the UE is a stationary device.

7. The method of claim 6, wherein performing the network security action includes blocking the SBI request message in response to determining that the serving network identifier indicates a non-home network of the UE and that the UE is a stationary device.

8. The method of claim 1, wherein performing the network security action includes blocking the SBI request message in response to determining that the previous network of the UE indicated by the information obtained from the SCP and the current network of the UE indicated by the SBI request message are separated by a distance could not have been traveled by the UE within the time difference.

9. The method of claim 1, wherein the SEPP comprises a home network SEPP of the UE.

10. A system for performing a location and velocity check at a security edge protection proxy (SEPP) using a service communication proxy (SCP), the system comprising:
the SCP including an application programming interface (API) for providing access to last known update information for a user equipment (UE); and
the SEPP for receiving a service-based interface (SBI) request message relating to the UE, querying the SCP to obtain the last known update information for the UE,
receiving a response from the SCP, the response including information indicative of the last known update of the UE,
the SEPP for reading, from the received response, the information indicative of the last known update of the UE,
performing, using the information indicative of the last known update of the UE, the location and velocity check for the UE,
wherein the SEPP is configured to perform the location and velocity check by determining whether a distance between i) a previous network of the UE indicated by the received response from the SCP and ii) a current network of the UE indicated by the SBI request message is greater than a distance that could have been traveled by the UE in light of a time difference between iii) a time associated with the last known update information of the UE and iv) a time of receipt of the SBI request message, and
the SEPP for performing a network security action based on results of the location and velocity check.

11. The system of claim 10, wherein the SBI request message comprises an NausfUE_Authentication_Authenticate request message.

12. The system of claim 10, wherein the SBI request message comprises Nudm_UECM_RegistrationRequest message.

13. The system of claim 10, wherein the SEPP is configured to query the SCP using the API provided by the SCP for obtaining the information indicative of the last known update.

14. The system of claim 10, wherein the last known update information includes a serving network identifier and a time of a last known update of the UE.

15. The system of claim 14, wherein the SEPP is configured to perform the location and velocity check by determining that the serving network identifier indicates a non-home network of the UE and that the UE is a stationary device.

16. The system of claim 15, wherein the SEPP is configured to perform the network security action by blocking the SBI request message in response to determining that the serving network identifier indicates a non-home network of the UE and that the UE is a stationary device.

17. The system of claim 10, wherein the SEPP is configured to perform the network security action by blocking the SBI request message in response to determining that the previous network of the UE indicated by the information obtained from the SCP and a current network of the UE indicated by the SBI request message are separated by a distance could not have been traveled by the UE within the time difference.

18. One or more non-transitory computer readable media having stored thereon executable instructions that when executed by a processor of a computer control the computer to perform steps comprising:
receiving, at a security edge protection proxy (SEPP), a service-based interface (SBI) request message relating to a user equipment (UE);
querying, by the SEPP, a service communication proxy (SCP) to obtain information indicative of a last known update of the UE with a home network of the UE;
receiving, at the SEPP, a response from the SCP, the response including the obtained information indicative of the last known update of the UE;
reading, by the SEPP and from the response, the obtained information indicative of the last known update of the UE;
performing, by the SEPP and using the obtained information indicative of the last known update of the UE, a location and velocity check for the UE, wherein performing the location and velocity check includes determining whether a distance between a previous network of the UE indicated by the information obtained from the SCP and a current network of the UE indicated by the SBI request message is greater than a distance that could have been traveled by the UE in light of a time difference between a time associated with the last known update information of the UE and the time of receipt of the SBI request message; and
performing a network security action based on results of the location and velocity check.

* * * * *